(No Model.)
J. CHAFFIN.
GATE.
No. 358,015. Patented Feb. 22, 1887.
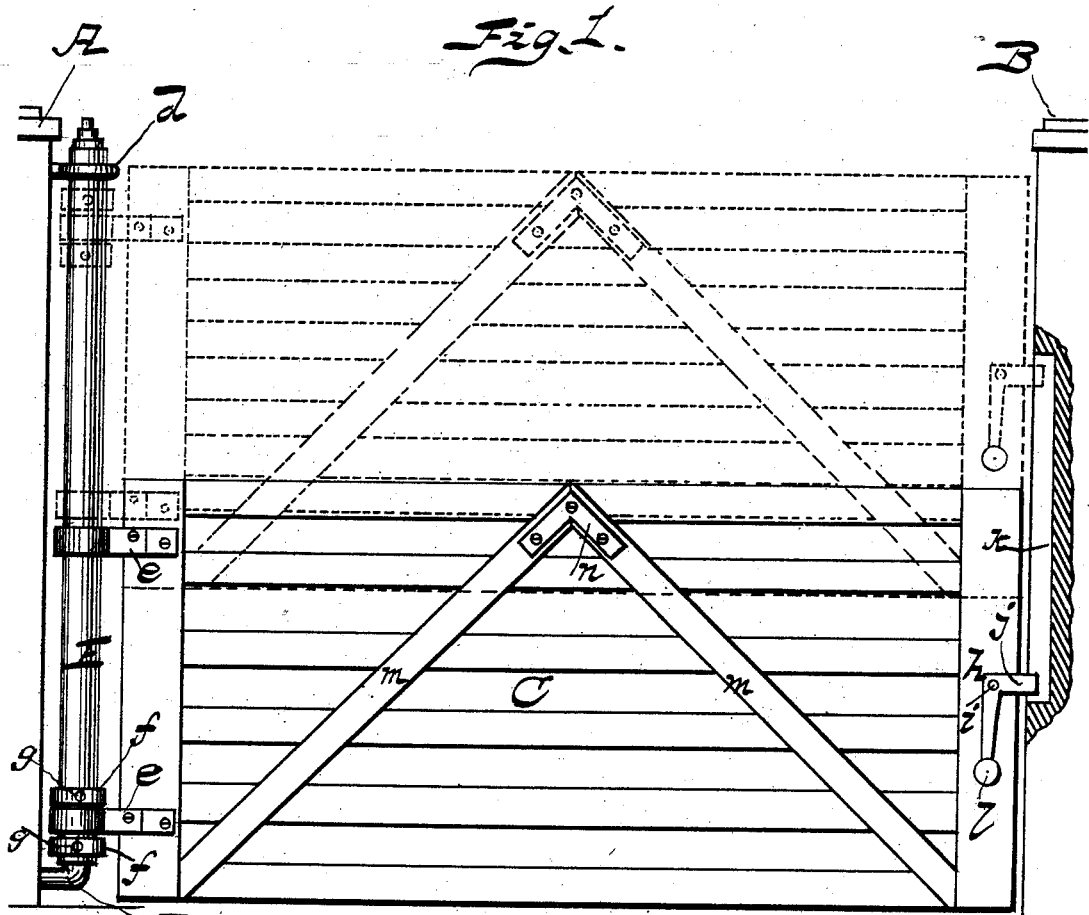
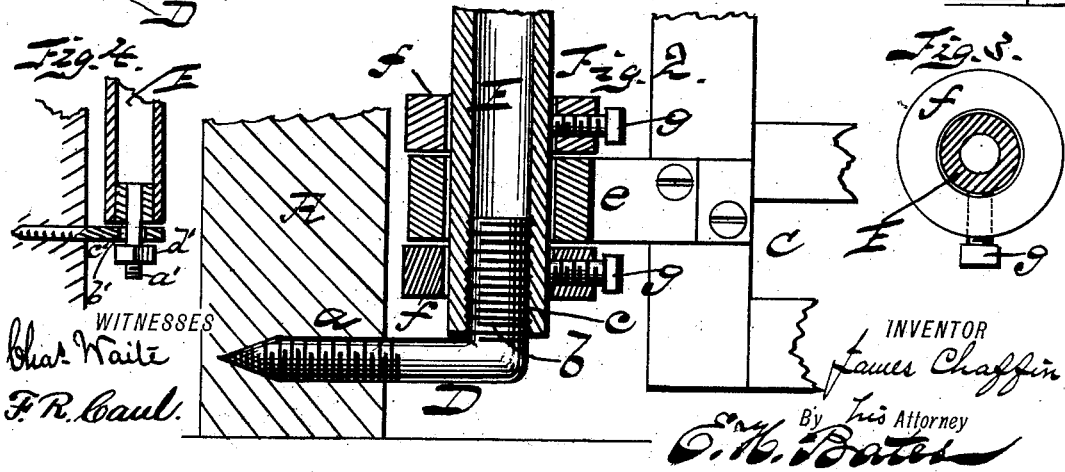

UNITED STATES PATENT OFFICE.

JAMES CHAFFIN, OF RIPON, WISCONSIN, ASSIGNOR OF ONE-HALF TO WILLIAM W. ROBINSON, OF SAME PLACE.

GATE.

SPECIFICATION forming part of Letters Patent No. 358,015, dated February 22, 1887.

Application filed January 8, 1887. Serial No. 223,789. (No model.)

*To all whom it may concern:*

Be it known that I, JAMES CHAFFIN, a citizen of the United States, residing at Ripon, in the county of Fond du Lac and State of Wisconsin, have invented certain new and useful Improvements in Gates; and I do hereby declare the following to be a full, clear, and exact description of the invention, such as will enable others skilled in the art to which it appertains to make and use the same.

This invention relates to improvements in swinging gates; and it consists in the novel construction and arrangement of the same, whereby the gate can be sprung open and closed, as well as be vertically adjusted, and be retained in any desired position, all as will be hereinafter fully explained, and particularly pointed out in the appended claims.

The annexed drawings, to which reference is made, fully illustrate my invention, in which—

Figure 1 represents a front view of my gate. Fig. 2 is a detail sectional view of the lower portion thereof. Fig. 3 is a transverse sectional view of the tube, and Fig. 4 is a view of a modification of the device for fastening the tube to the lower end of the gate-post.

Referring by letter to the accompanying drawings, A designates the gate-post. B is the latch-post, and C indicates the gate.

To the lower portion of the gate-post A is secured an angular bearing, D, which is screw-threaded on its horizontal portion, as at $a$, to screw into the post, and its vertical portion $b$ is also provided with threads, which engage female threads $c$ in the lower end of a rod or tube, E, which latter is supported thereby and held fast to the gate-post, while the upper portion thereof passes through one or more eyes or staples, $d$, secured to the upper portion of said post, thus firmly but removably securing the tube or rod to the gate-post.

The gate C is attached to this tube by hinges $e\ e$, which are preferably "strap-hinges," and has its swinging and vertically-adjustable movement thereon; and adjustably applied to said tube are two collars, $f\ f$, one of which is arranged below the hinge and the other above the same, and which are provided with set-screws $g\ g$, whereby said collars may be retained in position after adjustment.

The gate is provided with an angular latch-lever, $h$, which is pivoted thereto, as at $i$, and is designed to engage by its short arm $j$ a slot, $k$, in the latch-post. Weighted arm $l$ serves as a lever or handle, whereby the operator may unlatch the same from said post. The diagonal brace-bars $m$ of the gate are braced and strengthened at their meeting ends by an angular bar, $n$, which is securely attached thereto, as shown in the drawings.

It will thus be seen that the gate can be readily opened and closed by swinging on its hinges, and also can be vertically adjusted to a desired height and held in position by the collars aforesaid. Thus, in case of deep snows, the gate will not be obstructed, and the opening beneath the same can be regulated to permit small animals to pass through, while larger animals are prevented from doing likewise. At the same time the gate can be readily swung open and closed whether in a raised or lowered position; and it will be further observed that the upper collar, when screwed fast to the tube, prevents animals from raising the gate higher than it is set by the operator. The gate is durable, cheap to construct, and not liable to get out of order, while at the same time sagging of the gate is prevented. The slot in the latch-post is of sufficient length to allow the latch to engage it at any time the gate is closed, whether in a raised or lowered position.

In Fig. 1 it will be seen that the gate is shown in dotted lines as elevated, and that the collars are applied to the tube near the upper gate-hinge, the result being the same as when applied near the lower hinge. Fig. 4 shows a modification of the device for securing the tube to the post, which consists in providing the tube with a projecting screw-threaded point, $a'$, which enters an eye, $b'$, in an arm, $c'$, that screws into the post, and has a nut, $d'$, applied, whereby the tube is held to said eye.

I am aware that it is not new to elevate gates and retain them at different heights by substantially the same means. Therefore I do not claim such invention, broadly; but, Having described my invention, what I claim, and desire to secure by Letters Patent, is—

1. The combination, with the gate and post A, of the angular screw-threaded support D, the rod or tube E, and collars $f\,f$, provided with the set-screws $g\,g$, as and for the purpose set forth.

2. The combination, with the gate provided with the hinges $e\,e$, angular brace-bar $m$, and angular latch $h$, of the tubular support E, angular screw-threaded support D, collars $f\,f$, provided with set-screws $g\,g$, and staple $d$, the whole adapted to operate as and for the purposes specified.

In testimony whereof I affix my signature in presence of two witnesses.

JAMES CHAFFIN.

Witnesses:
W. W. ROBINSON,
H. OLIVIA WORK.